(12) United States Patent
Carlen

(10) Patent No.: US 9,603,210 B1
(45) Date of Patent: Mar. 21, 2017

(54) HIGH SPEED, HIGH CURRENT PULSED DRIVER CIRCUIT

(71) Applicant: Sandia Corporation, Albuquerque, NM (US)

(72) Inventor: Christopher R. Carlen, Livermore, CA (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/998,101

(22) Filed: Dec. 24, 2015

Related U.S. Application Data

(60) Provisional application No. 62/096,608, filed on Dec. 24, 2014.

(51) Int. Cl.
*H05B 33/08* (2006.01)

(52) U.S. Cl.
CPC ................................. *H05B 33/0818* (2013.01)

(58) Field of Classification Search
CPC ............ H05B 33/0815; H05B 33/0818; H05B 33/0884; H05B 33/0809; H05B 33/0803
USPC .......................... 315/291, 294, 210, 224, 307
See application file for complete search history.

(56) References Cited

U.S. PATENT DOCUMENTS

| | | | | |
|---|---|---|---|---|
| 4,716,274 A * | 12/1987 | Gilliland | ............... | B23K 9/1087 219/130.21 |
| 6,122,704 A * | 9/2000 | Hass | ....................... | G01K 1/028 374/E1.006 |
| 6,144,222 A | 11/2000 | Ho | | |
| 6,222,172 B1 | 4/2001 | Fossum et al. | | |
| 6,400,101 B1 * | 6/2002 | Biebl | ................. | H05B 33/0818 315/185 R |
| 6,586,890 B2 | 7/2003 | Min et al. | | |
| 6,690,146 B2 | 2/2004 | Burgyan et al. | | |
| 6,734,639 B2 | 5/2004 | Chang et al. | | |
| 2004/0155844 A1 * | 8/2004 | Stopa | .................. | H05B 33/0815 345/82 |
| 2006/0017062 A1 * | 1/2006 | Hashimoto | ............... | H01S 5/30 257/103 |
| 2008/0129219 A1 * | 6/2008 | Smith | .................. | H02M 3/1584 315/291 |
| 2009/0010288 A1 * | 1/2009 | Keaton | ................. | H01S 3/0057 372/25 |
| 2009/0184655 A1 * | 7/2009 | Miller | ................. | H05B 33/0815 315/291 |
| 2010/0109558 A1 * | 5/2010 | Chew | .................. | H05B 33/0803 315/294 |
| 2011/0298393 A1 * | 12/2011 | Chew | .................. | H05B 33/0821 315/294 |
| 2013/0320880 A1 * | 12/2013 | Walker | .................... | H05B 37/02 315/294 |
| 2015/0042234 A1 * | 2/2015 | Lee | ......................... | H05B 33/08 315/193 |

(Continued)

*Primary Examiner* — Douglas W Owens
*Assistant Examiner* — Syed M Kaiser
(74) *Attorney, Agent, or Firm* — Medley, Behrens & Lewis, LLC

(57) ABSTRACT

Various technologies presented herein relate to driving a LED such that the LED emits short duration pulses of light. This is accomplished by driving the LED with short duration, high amplitude current pulses. When the LED is driven by short duration, high amplitude current pulses, the LED emits light at a greater amplitude compared to when the LED is driven by continuous wave current.

20 Claims, 12 Drawing Sheets

(56) References Cited

U.S. PATENT DOCUMENTS

2016/0094763 A1* 3/2016 Patel .................... H04N 5/2256
348/333.13

* cited by examiner

HIGH SPEED, HIGH CURRENT PULSED DRIVER CIRCUIT

RELATED APPLICATION

This application claims priority to U.S. Provisional Patent Application No. 62/096,608, filed on Dec. 24, 2014, and entitled "HIGH SPEED, HIGH CURRENT PULSED LED DRIVER", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

A beam of bright light can be required for certain applications. A laser can be utilized to provide such light, but laser light is both coherent and monochromatic, which can lead to the light interfering with itself and giving rise to a phenomenon of "laser speckle". Laser speckle can be problematic with imaging applications, such as Schlieren photography, and can be difficult to remove and/or minimize. A further problem may be that an experiment may desirably include use of light of a particular wavelength; however, an available laser may emit light of a different wavelength. Still further, lasers may be very expensive.

Xenon arc lamps can be substitutes for lasers in certain scenarios. However, a xenon arc lamp generates white light; accordingly, if some other wavelength is to be employed in an experimental setting, then the light emitted by the xenon arc lamp must be filtered, which may result in inefficiencies and/or cause light coupling issues. Moreover, xenon arc lights cannot be pulsed.

SUMMARY

The following is a brief summary of subject matter that is described in greater detail herein. This summary is not intended to be limiting as to the scope of the claims.

Described herein are various technologies related to causing a light emitting diode (LED) (which may optionally be a high-power LED) or laser diode (LD) to emit short duration pulses. With more particularity, a driver circuit can drive the LED with short duration, high-current pulses, where the driver circuit can be bipolar (a 2-quadrant, positive voltage, positive or negative current) driver circuit. In an example, optical pulses can have a duration of less than about 20 ns for a 1 mm² LED, and down to about 10 ns or less for a high-power LED with relative peak optical power≥1.0 (where "relative optical power" (Prel) is defined, with optical power (Po), and some reference current density (Jref), as: Prel=Po/Po(Jref), and for a high power LED, Jref≥0.35 A/mm²). Further, in an example, the driver circuit and LED, etc., can be integrated with a heatsink into an assembly.

In another exemplary embodiment, pulsed current provided to the LED can be scaled up by configuring the driver circuits in parallel. Utilization of the driver circuit (or driver circuits in parallel) to drive the LED with short duration, high current pulses where the current amplitude is significantly greater than (e.g., 20% or more greater than) the maximum continuous current rating of the LED causes the LED to generate light with greater intensity (higher brightness) compared to when the LED is driven by continuous wave (CW) current (at its maximum rating). The operation with short duration, high current pulses where the current amplitude is significantly greater than the maximum continuous current rating of the LED can be referred to as "pulsed overdrive" or "overdrive".

The driver circuit can be designed to improve the minimum achievable optical pulse duration emitted by LEDs (compared to known minimum achievable optical pulse durations, e.g., for high power LEDs). There are various techniques for improving this pulse duration, which will be described in greater detail below.

Also described herein is a system that includes a (densely packed) array of differently colored LED chips, which can be controlled to generate light of multiple colors. The driving of the LED chips by multiple independent driver channels can be independently timed, and, as the chips are densely packed, light emitted from the array of chips emanates as if from a nearly coincident source.

Furthermore, in an example, a system that includes one or more driver circuits that drives the LED can be a configurable system that comprises a matrix of switches. The switches can be controlled to connect and disconnect sub-parts of the system into various combinations, thereby allowing for different operational modes.

In yet another exemplary embodiment, a system that includes the LED and the driver circuits that drives the LED can be configurable, such that the LED can be driven in a continuous wave mode or pulsed mode. Constant current utilized to drive the LED can be regulated by a primary power supply or by an auxiliary power supply.

The above presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
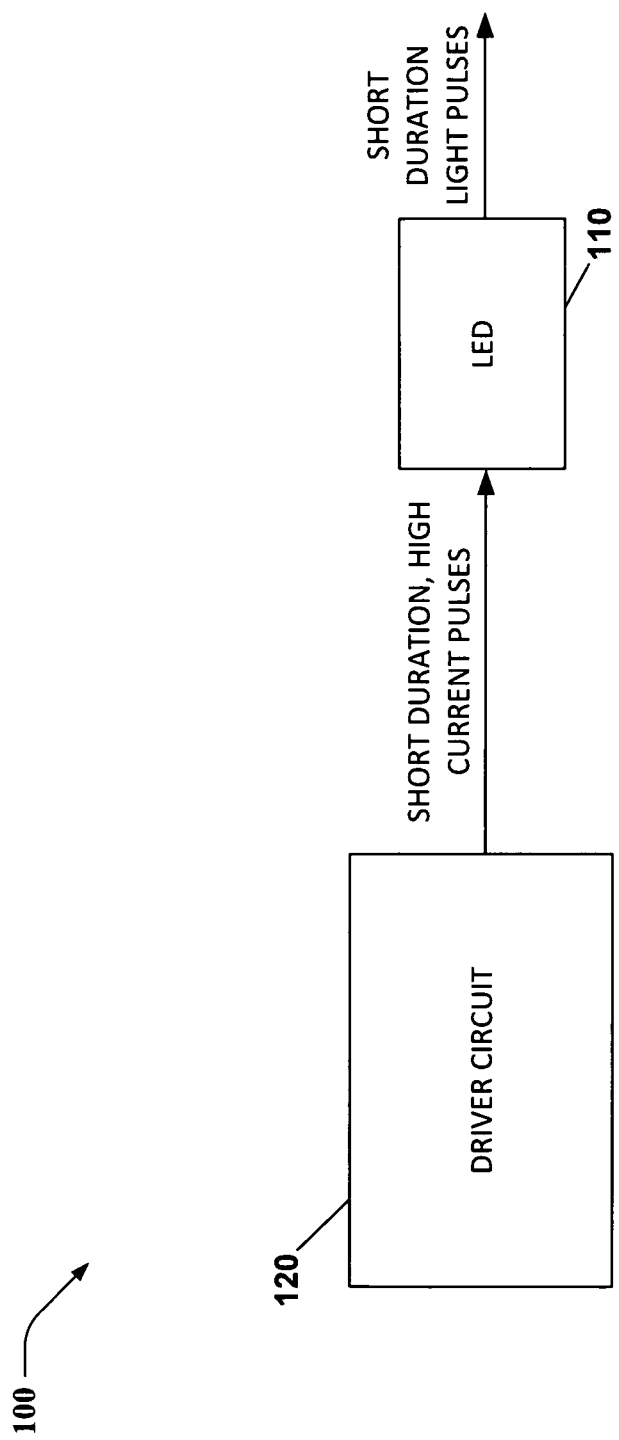
FIG. 1 is a functional block diagram of a system that is configured to cause a LED to emit short duration light pulses.

Various technologies are presented herein pertaining to utilizing a high speed, high current pulsed driver circuit to operate a diode (e.g., light-emitting diode (LED) or a laser diode (LD)), wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

Described herein are various technologies related to a high speed, high-current pulsed driver circuit, wherein the driver circuit can be configured to allow for a LED or LD (both of which are referred to hereafter as LED) to emit light with greater intensity (brightness), or optical flux, when compared to continuous wave (CW) light emitted by LEDs using conventional driver circuits. The various embodiments presented herein can be utilized with various science, engineering, and R&D applications such as high speed imaging, Schlieren stop-motion imaging, particle image velocimetry, etc., as well as new measurement techniques that are otherwise possible only with far more expensive and/or physically larger light sources, typically requiring a more complex optical setup.

FIG. 1 is a functional block diagram of an exemplary system 100 that includes a LED 110 that is configured to emit short duration light pulses. In an example, the LED 110 can be a high-power LED, where a high-power LED is one in which the current density for which the LED is rated is ≥0.35 A/mm$^2$. The system 100 includes a driver circuit 120 that is configured to drive the LED 110 with short duration, high current pulses. The LED 110, responsive to receipt of the short duration, high current pulses, emits short duration light pulses. Examples of such durations as they apply to LEDs 110 having a range of sizes include: a) LED 110 is 1 mm$^2$, from about ≤20 ns up to about 100 μs (for high-current pulsing, or up to CW); b) "Large area" LEDs (e.g., ≥4 mm$^2$ and typically 9 mm$^2$), from about ≤80 ns up to about 100 μs (for high-current pulsing, or up to CW); and c) series connected arrays comprising 2 or more 1 mm$^2$ LED chips, (e.g., 4 LED chips), from about ≤10 ns up to about 100 μs (for high-current pulsing, or up to CW) and where it has been observed to be able to achieve down to 7 to 9 ns optical output pulse durations, and may further be possible using the techniques described herein to achieve down to about 5 ns optical pulses. Such optical pulses (e.g., in the exemplary case of ≤10 ns, or 7 to 9 ns, for quad series connected 1 mm2 LEDs) can be achieved by closely electrically integrating LEDs with high-speed, high-current driver circuits. The driver circuit 120, in an example, can output current pulses so as to generate optical output pulses from the LED according to the duration(s) identified above, where, for example, the current amplitude of such pulses can be between about 0.35 amps to 30 amps (e.g., as a typical maximum for a single driver channel, although not limited to this value). As will be described in greater detail below, driver circuits can be arranged in parallel, such that each driver channel emits short duration, high current pulses that are combined to generate pulses with even greater amplitude.

In an exemplary embodiment, the driver circuit 120 can be characterized as being a bi-polar driver circuit, in that the driver circuit 120 can be a 2-quadrant, positive voltage, positive and negative current driver circuit. Exemplary (non-limiting) instantiations of such a circuit are presented herein.

More specifically, the driver circuit 120 can be or include a complementary metal oxide semiconductor (CMOS) power inverter (e.g., in combination with other circuit elements). Further, the driver circuit 120 may include a trigger input inverter and a level translator (which may translate voltage amplitude and/or polarity). These components enable trigger input signal voltage levels (e.g., from an external square wave pulse generator) to be at levels that are typical for digital logic systems, e.g., from about 0 to 1.1V (low logic level) to about 2.0 to 5.0V (high logic level). In an embodiment, the CMOS power inverter and the input inverter (e.g., which may optionally include a level translator) can together be characterized as a metal-oxide semiconductor field-effect transistor (MOSFET) gate driver integrated circuit (IC) in the driver circuit 120.

As indicated above, the LED 110 emits short duration light (optical) pulses. As further described herein, the fall time a pulse emitted by the LED 110 is improved (reduced) in comparison with the fall time achievable with a conventional system, e.g., a unipolar (forward current drive only) driver circuit. This can be accomplished by shunting stored charge from the LED 110 to ground when the LED 110 is to cease emitting light. For example, the typical fall time for a 1 mm$^2$ LED under unipolar drive at 1.5 amperes may be at least 70 ns. In contrast, the fall time achievable through use of the driver circuit 120, applied to the same LED and conditions, is 550 ns. Accordingly, at least a 30% improvement in fall time can be achieved when using the driver circuit 120 (as further described, an improvement in the shape of the falling edge of the pulse can also be achieved—e.g., the falling edge has a shape that is more square compared to an "exponential decay" shape, as obtained with unipolar drive).

As will be depicted below, a power supply (either a positive or negative power supply) can emit a direct current (DC) power supply voltage (Vdd), where the pulse current amplitude applied to the LED 110 by the driver circuit 120 can be a function of Vdd. Still further, the driver circuit 120 can be configured with an output enable/disable function (and with a possibly corresponding external input). With more particularity, another signal source can be arranged to provide a control signal that, by being directed to the input which controls the output enable/disable function, can control when the driver circuit 120 is able to direct current to the LED 110. In this case, when the control signal disables the output, the output is caused to be in a high-impedance state, (e.g., "tri-state" such as in a typical digital bus driver/buffer device), effectively disconnecting the LED 110 from the driver circuit 120.

While the system 100 depicts a single driver circuit 120, it is to be understood that the system 100 can include multiple driver circuits (e.g., arranged in parallel, as independently triggerable channels, etc.). Utilizing the parallel case of such an arrangement, the pulse current provided to the LED 110 can be scaled up by a factor of n, when paralleling a plurality (n) of driver circuits 120. Further, more than one LED can be driven by the plurality of driver circuits. Bridging two or more (m) already paralleled groups of driver circuits to further scale up output pulse current by a factor of m, (for a total of n*m*the output pulse current capability of a single channel) can be accomplished through use of a "master-in/master-out, slave-out" architecture (MI/MOSI). To allow for monitoring or measuring of the instantaneous pulse current (e.g., by other integrated circuitry or external circuitry), a current sense circuit (such as a resistor) can be placed between the cathode of the LED 110 and ground (or between the common current return node/bus and ground in the case of a system of several drivers, whether operating independently or in parallel). The circuitry used to monitor or measure the instantaneous pulse current can include a low-pass filter, which may be of any suitable type. This circuitry may be particularly well-suited when the LED 110 is a high power LED.

The LED 110, by virtue of being driven by the driver circuit 120 (which emits short duration, high current pulses), can emit light pulses that have a higher brightness (intensity), or optical flux, when compared to intensity of light emitted by a LED when being driven by continuous wave (CW) current. For example, the. LED 110 can be driven by a pulse current that has an amplitude that is in excess of the CW maximum allowed forward current (overdrive). Further, Vdd (referenced above) can be varied to regulate pulse current.

Figure 10:
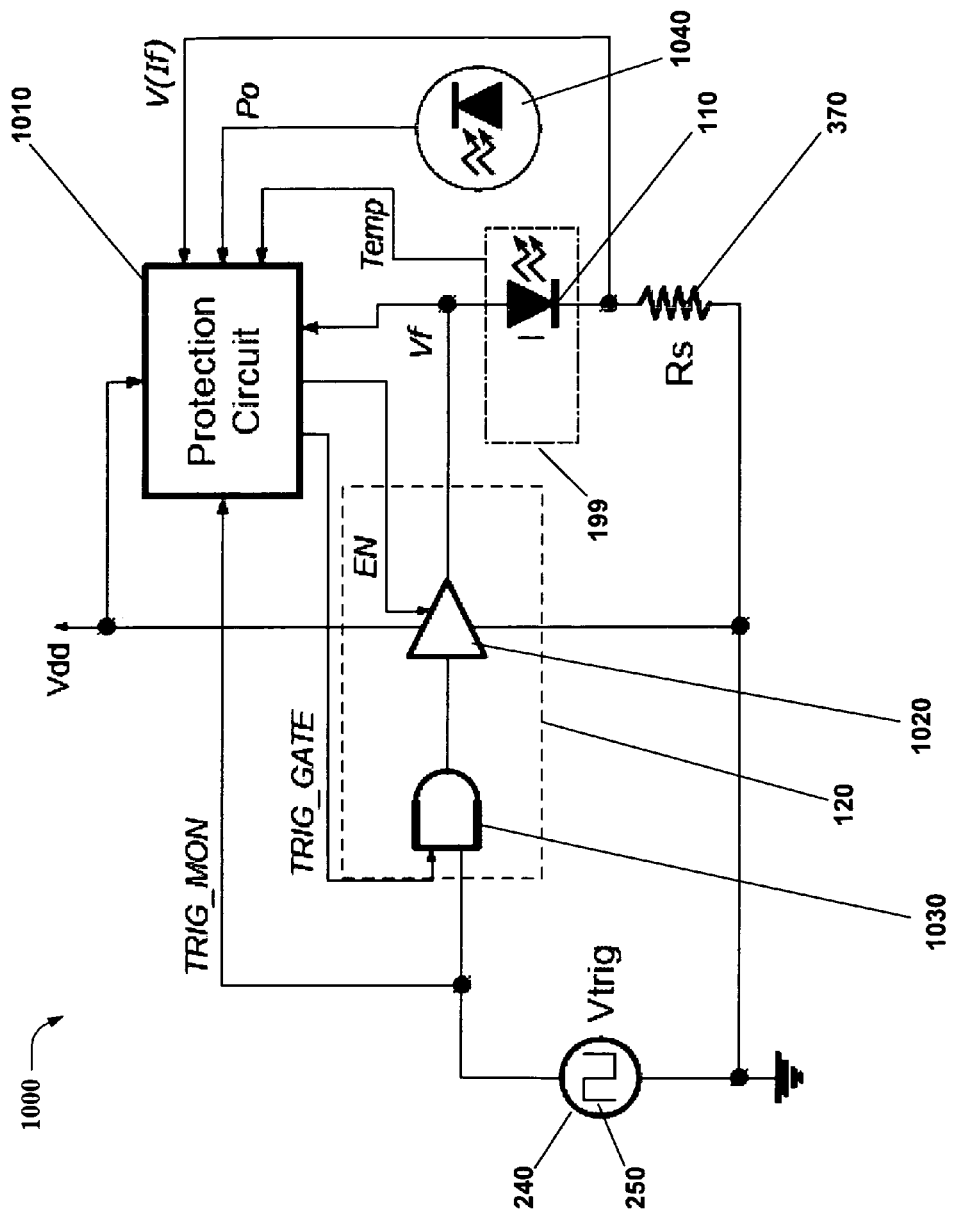

Failure of the LED 110 when being (over-)driven by the driver circuit 120, and possible subsequent failure of the driver circuit 120 itself, can be prevented by regulating, limiting, or otherwise controlling the instantaneous, real-time, shot-to-shot, and/or average values of various operating parameters of the LED 110 and driver circuit 120 to safe values. These safe values can be determined by collecting and utilizing characterization data from a system 100 comprising a LED 110 and driver circuit 120 over a range of input and output parameter values. With reference to FIG. 10, a circuit 1000 is depicted, wherein the circuit 1000 indicates that the system 100 optionally further includes a protection circuit 1010 to prevent or greatly reduce the likelihood of the LED 110 and/or driver circuit 120 being damaged or destroyed by automatically, dynamically or instantaneously performing one or more protection operations including: 1) cutting off the LED drive by gating the trigger input signal; 2) cutting off the LED drive by disabling one or more outputs of the driver circuit 120 (e.g., put into high-Z state); or 3) controlling Vdd. The protection circuit 1010 can be configured to perform a protection operation based upon: 1) real-time measurements of the instantaneous and/or average values of various LED 110 or driver system input or output parameters; 2) predicted average junction temperature; 3) predicted instantaneous junction temperature; and/or 4) other predicted conceptions of damage thresholds of the LED 110. The predictions referenced above can be made based upon stored characterization data, and further based upon a heat-transfer physics model, a heuristic model, empirically determined characterization data, or the like. The protection circuit 1010 can be a digital logic circuit, an analog logic circuit, a mixed signal circuit (e.g., ADC/DAC, etc.), or other suitable module. Further, the protection circuit 1010 can be included in, implemented as, or be controlled by, a microcontroller, a microprocessor, etc.

Through utilization of the driver circuit 120 in conjunction with the LED 110, the minimum achievable optical pulse duration can be improved relative to conventional LED operation, e.g., while using bipolar drive to drive the LED 110. Various techniques are contemplated to facilitate such improvement. For instance, Vdd can be increased (e.g., as the driver circuit 120 has greater output slew rate as Vdd increases). Another technique is to place a plurality of LEDs 110 in series, and cause the driver circuit 120 (or parallel driver circuits) to drive the series connected LEDs. In an embodiment, a number of series connected LEDs 110 can be chosen such that the forward voltage (Vf) of the LEDs is approximately matched to the loaded driver output voltage where the driver circuit 120 achieves maximum slew rate. Further, a value of Vdd can be chosen such that the chosen value of Vdd corresponds to the maximum slew rate.

In yet another embodiment, the LED 110 can be connected to the driver circuit 120 via a low impedance transmission line. The transmission line can include multiple (e.g., 2 or more of each of) LED anode wires and LED cathode wires. These wires can be in any suitable configuration, e.g., in a braided combination, in a parallel arrangement (such as a ribbon cable) with alternating anode/cathode wires, multiple parallel coax cables, etc. (e.g., as further represented in FIG. 3).

In a further embodiment, as further described, the pulse duration of the driver circuit 120 can be optimized (e.g., to a shortest possible output pulse) based upon adjusting the trigger signal amplitude such that it barely crosses the input switching threshold. Moreover, optical pulse duration can be optimized by incorporating a variable DC power supply into the system 100 (e.g., as Vcc powering buffer 340 in FIG. 3) such that a constant input trigger pulse amplitude is able to be converted (e.g., as by 340 in FIG. 3) into a variable amplitude internal trigger signal to be applied to the inputs of the power driver sub-circuits (e.g., in the driver circuit 120, and as the signals from the outputs of buffer 340 in FIG. 3). Further, high speed digital, or radio frequency (RF) printed circuit board (PCB) layout techniques can be utilized.

When multiple driver circuit channels are arranged in parallel, the optical pulse duration can be optimized at least in part by matching timing characteristics of the multiple driver channels and/or sub-systems of the driver circuit 120. This can be accomplished by characterizing individual drivers and paralleling them in matched sets according to propagation delays or rise/fall times, e.g., as a function of power supply voltage or as a function of load characteristics. Yet another technique that can be employed to reduce the optical pulse duration is matching trigger signal electrical path lengths to the driver channel inputs. In another example, when MI/MOSI bridging two or more systems, (e.g. as shown FIG. 7, circuit 700, which depicts bridging of just two such systems), by matching the electrical path length from the master primary buffer output to the parallel channels input node (i.e., the path from the output of buffer 340B (BUF2), through jumper JP1:5-6, to jumper JP2:{3, 6,9,12}) with the electrical path length from the master auxiliary buffer output to the slave parallel channels input node (e.g., the path from the output of 340A (BUF1), through jumper JP1:1-3-4, to master output J2, through the external connection from master output J2 to the slave input J3, through jumper JP3:4-6, finally to jumper JP4:{3,6,9, 12}).

Figure 8:
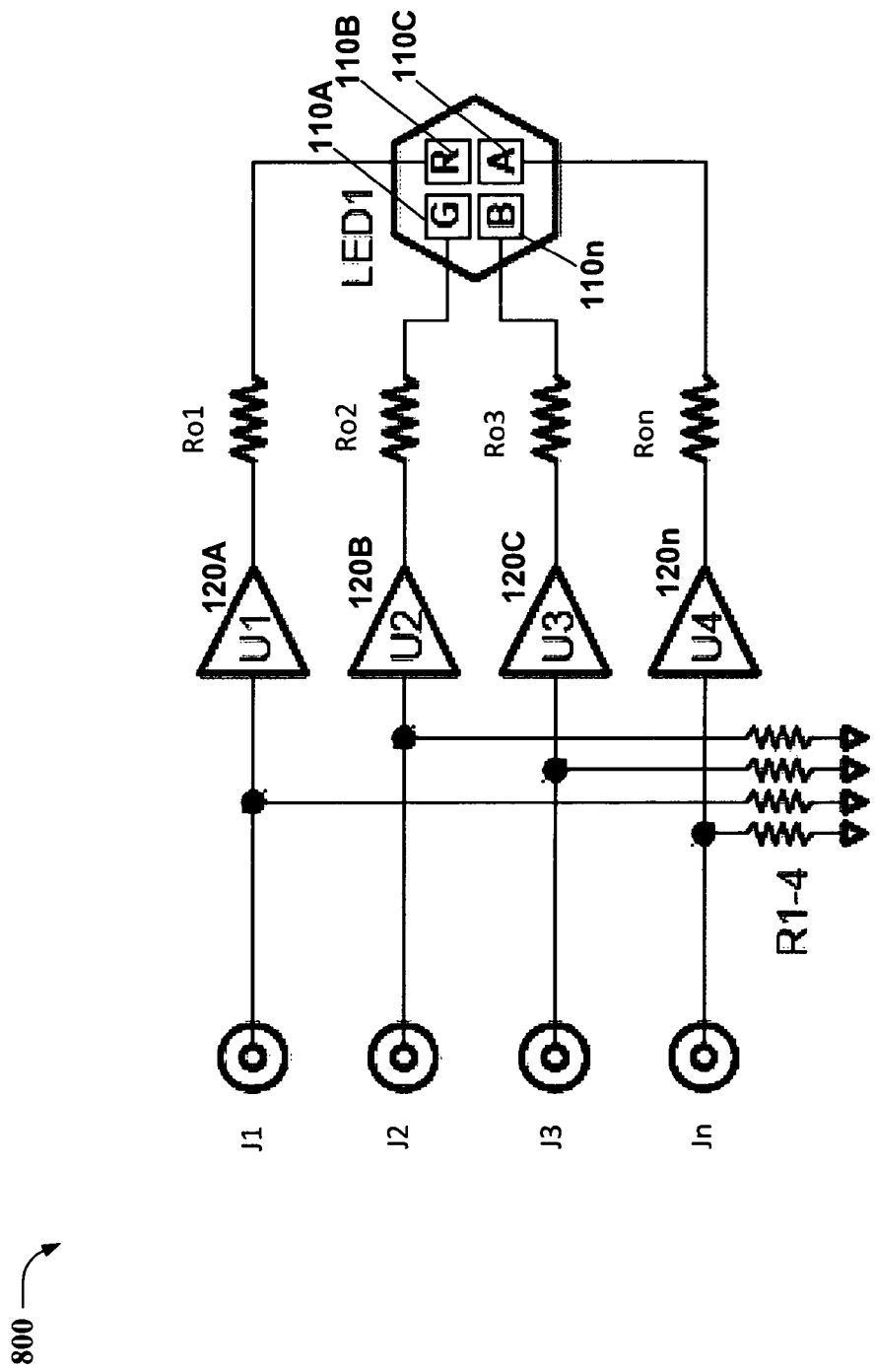

As further described herein, and shown in FIG. 8 (circuit 800), the system 100 can be configured such that light pulses of multiple colors that are independently timed can be emitted from a nearly coincident source. This can be accomplished by multiple driver circuits driving multiple LEDs 110A-110n (that emit different colors of light) in a densely packed array of LED chips (LED 1). LEDs can be incorporated into a densely packed array, e.g., as an individual LED dice packed into a multi-color array in a single emitter substrate/package. Independent timing of each LED 110A-110n can be achieved by having each color driven by its own driver(s) channel 120A-120n, each with its own trigger input J1-Jn.

Figure 6:
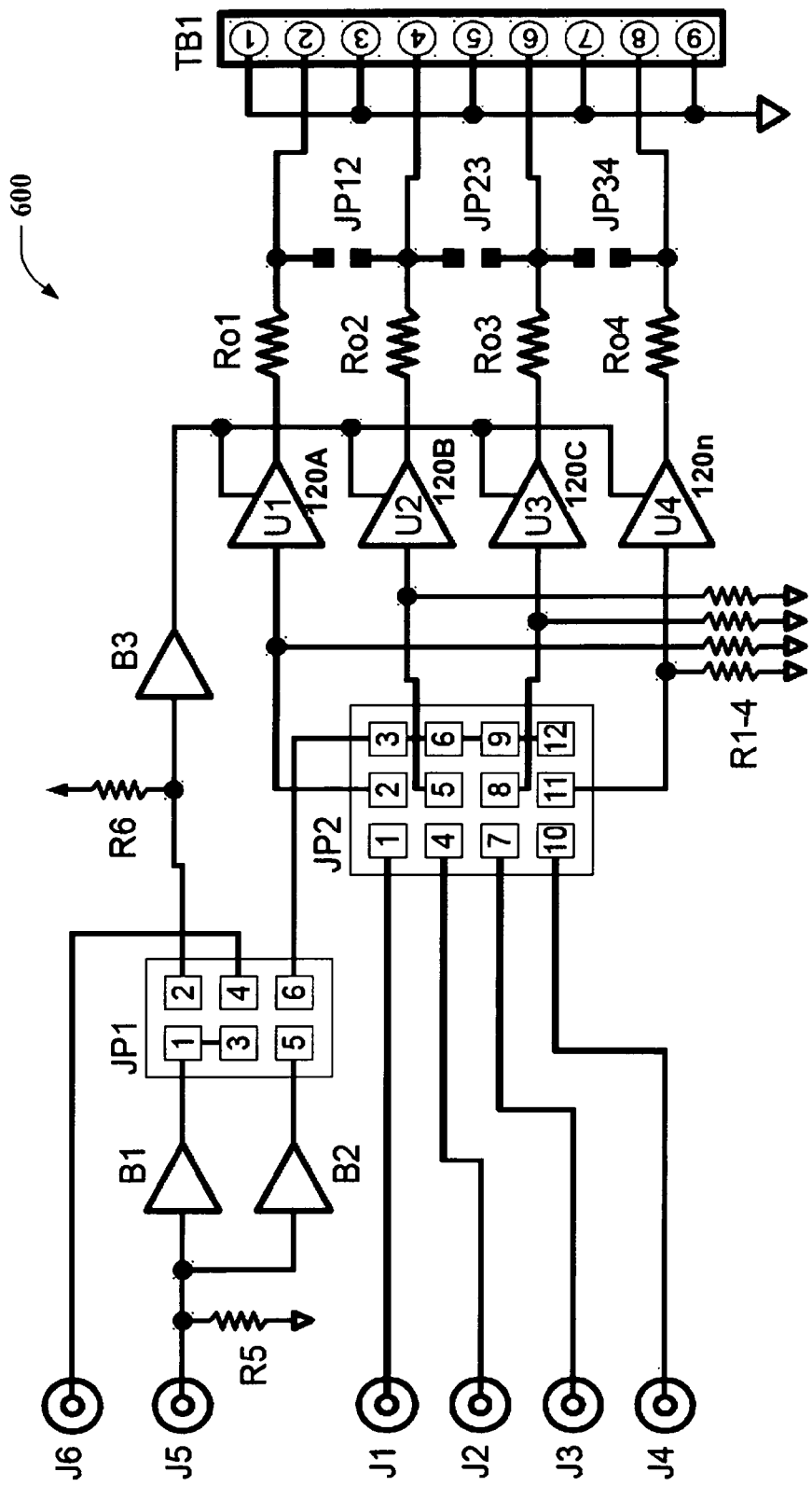
Figure 7:
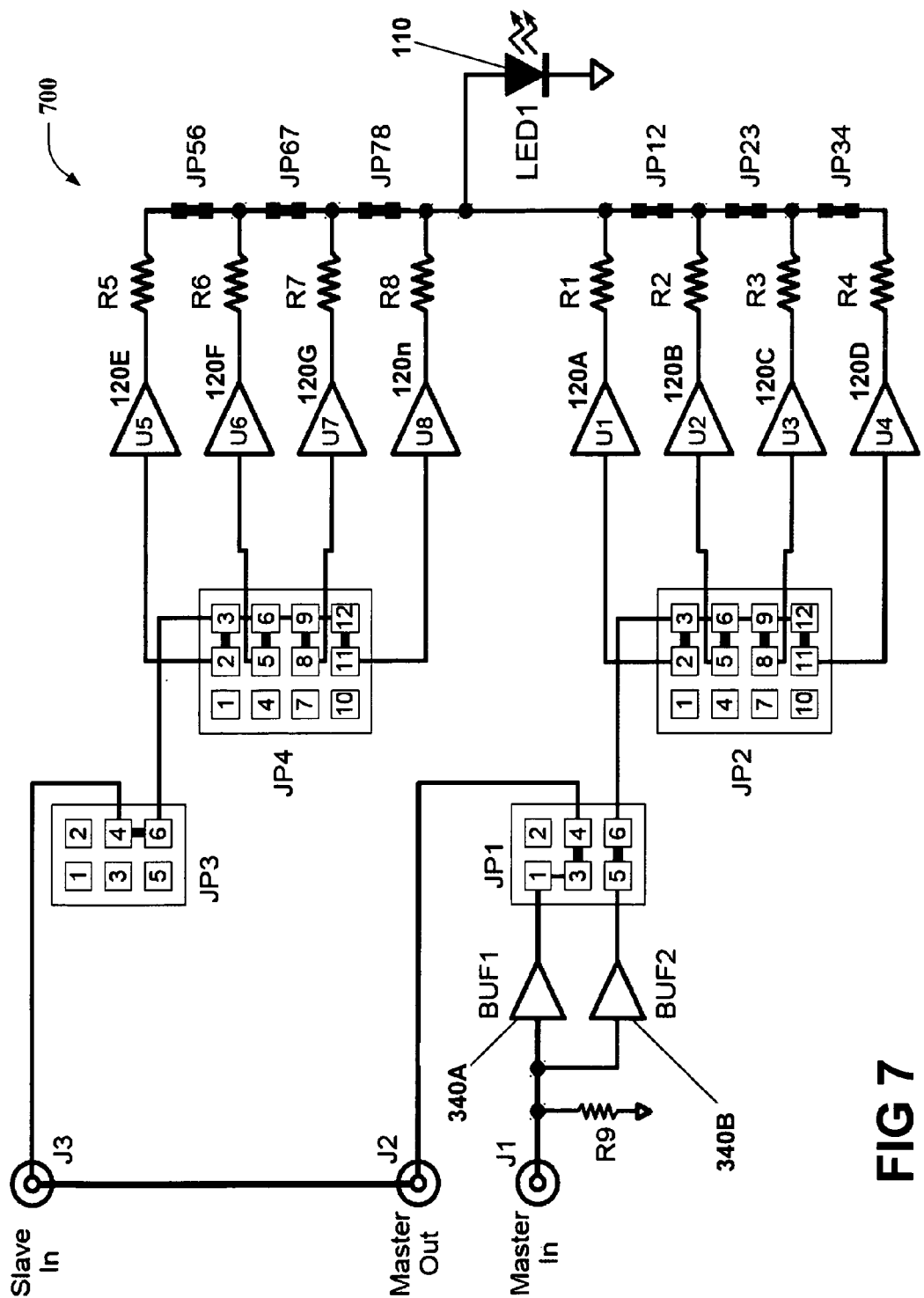

Further, as shown in FIG. 6, circuit 600, the system 100 can optionally include a matrix of switches, which connect driver circuits or sub-parts of the driver-circuits into various combinations, such that different operational modes may be set. The switches can be user-configurable to enable modifying the function of the system into various modes. The switches can be mechanical, electromechanical, or electronic types, or jumpers, and manually or electronically controlled. The switches can be configured to implement various functionality described herein and/or combinations of functionalities. A switch configuration can be utilized to combine N channels of driver circuits in a variety of possible combinations of parallel vs. single channel groups to create M individually triggerable channel groups. Further, the switch configuration can enable mapping of M input trigger signals to the inputs of M driver channels (or groups), and mapping the outputs of those groups to the anodes of various combinations of individual, series, or parallel combinations of LEDs, wherein the LEDs can be single-colored or multi-colored, e.g., in an array. For example, as shown in FIG. 10, circuit 1000, the switch configuration can enable mapping the input trigger signal through optional buffers, inverters, or logic gates, such as to interface with the IO signals of a protection circuit (e.g., as shown in FIG. 10, gate 1030). The switch configuration can enable mapping the input trigger signal through optional buffers, inverters, or logic gates to send a buffered version of the trigger input signal back out of the system, e.g., to implement MI/MISO bridging (for example, as shown in FIG. 7).

Figure 9:
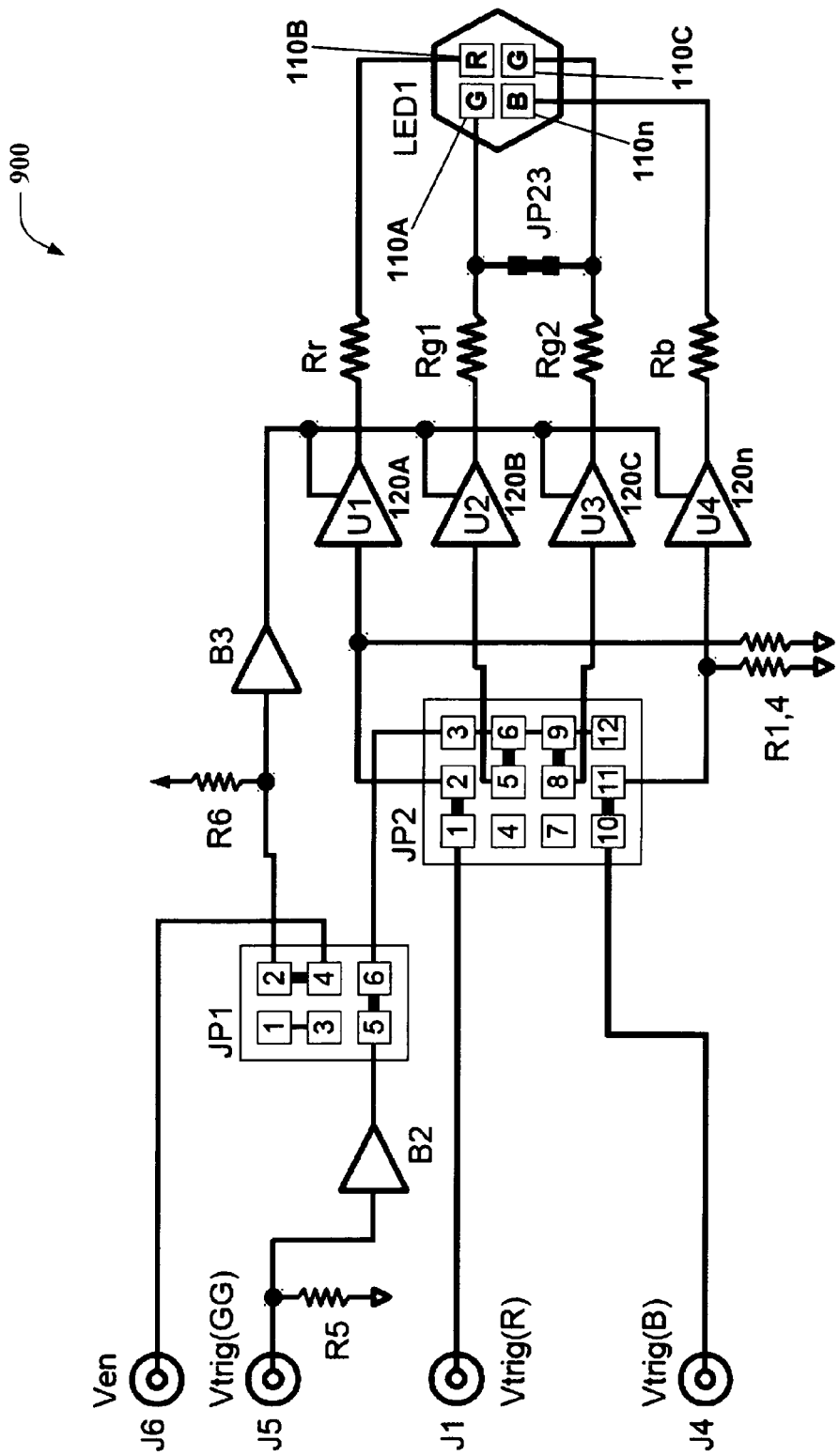

The switch configuration can enable mapping the input trigger signal through optional buffers, inverters, or logic gates to enable mapping an input signal to another function, such as connecting to an output enable control signal of the driver circuits (as shown in FIG. 6, circuit 600, and further in FIG. 9, circuit 900). This particular configuration can be used to allow, when the output is actually disabled via this means, a constant current (CC) source to be injected into the output to operate the LED in continuous wave (CW) mode, to calibrate, align optics, etc., where otherwise there may be circuit or other system limitations which preclude operating the LED 110 other than in pulsed mode. In other words, this approach can be used when the LED 110 is unable to be operated CW via the simpler approach, which is described below (LED 110 operated in CW mode), and it is desirable to work around this limitation without having to physically disconnect the LED or insert other components into the output circuitry to achieve CW operational mode. This can occur, as a particular example, when COTS MOSFET Driver ICs are used, which include an under-voltage lockout (UVLO) function that makes the system unable to be operated in CW mode simply by using an external power supply current regulation function and with holding the trigger input at the ON level. In an aspect, the LED forward voltage Vf is lower than the UVLO turn-on voltage. Hence, in an exemplary embodiment, when operating CW with CC current injection into the disabled output, Vdd can be provided and have an electrical voltage both greater than Vf by at least approximately 0.7V, and greater than the UVLO turn-on voltage.

In still yet another exemplary embodiment, the LED 110 can be operated in CW mode, while connected to the driver circuit 120. In such an embodiment, constant current (CC) can be regulated by the main power supply. The regulated CC can be provided by having the power supply be of the current limiting/regulating type (which is normally a voltage supply, but which includes a current limit setpoint which, when the load attempts to demand current in excess of this limit, causes the power supply to operate instead in constant current regulating mode), and by providing a constant ON trigger input signal level, while avoiding LED damage from an excessive initial current spike by adjusting the power supply voltage to a level just slightly above the voltage needed to provide the specified current magnitude, while accounting for the voltage drops through the driver circuit 120 in addition to the LED Vf. The regulated CC can also be provided by powering the LED 110 with CC provided by an auxiliary power supply, where the current is injected into the output channel of the driver circuit 120 while commanding/signaling the driver circuit 120 to have its output disabled (in a high-impedance state). Further, the driver circuit 120 can be powered by the main power supply so that the signal paths which permit disabling the output stage are operational, and with sufficient voltage so that the CC provided by the auxiliary source does not flow back into the output channel of the driver circuit 120 (through internal protection or substrate LEDs, etc.). Alternately, CW LED operation can also be arranged by first connecting the LED 110 to the driver via a series diode, (where the driver output connects to the diode anode, the diode cathode to the LED anode, and LED cathode connects (as normally) to the driver return terminal) and then injecting the CC into the output circuit at the node where the LED anode joins with the diode's cathode, with current provided by an auxiliary CC regulating power supply.

Further, the driver circuit 120 (or multiple driver circuits), and a heat sink, can be integrated into an assembly. The heat sink can include one or more mechanical mounting features for attaching LEDs with good thermal contact such as threaded (or unthreaded) hole patterns, etc. The mounting features can have geometry/dimensions compatible with standard LED mountings, such as 19~20 mm "star" MCP-CBs, and/or with certain geometry/dimensions compatible with proprietary LED mountings. The mechanical mounting features can enable attaching optics and/or optic holders, wherein such optics include lenses, parabolic or ellipsoidal reflectors, etc. The mechanical mounting features can also be optical "cage/rod" systems, which can serve to mount optic holders, thereby enabling positioning of optic holders with adjustable distance from the LED emitting aperture so as to adjust and fix focus or other optical parameters while maintaining the optic axis co-linear with the central LED normal axis. The mounting features can be configured to attach other accessories such as cooling fans, additional electronic circuit/functional assemblies, terminal blocks for making electrical connections, etc. The mechanical mounting features can be further configured to facilitate attaching the heat sink assembly to other devices and components, wherein the mechanical mounting features can include threaded (or unthreaded) hole patterns, notches, grooves, etc., in various locations to enable mounting in a variety of ways.

FIGS. 2-10 depict exemplary circuits that can optionally be incorporated into the system 100 shown in FIG. 1. It is to be understood that these circuits are set forth for purposes of illustration, and are not intended to be interpreted as to be limiting to any of the features and/or technologies referenced above with respect to FIG. 1.

Figure 2:
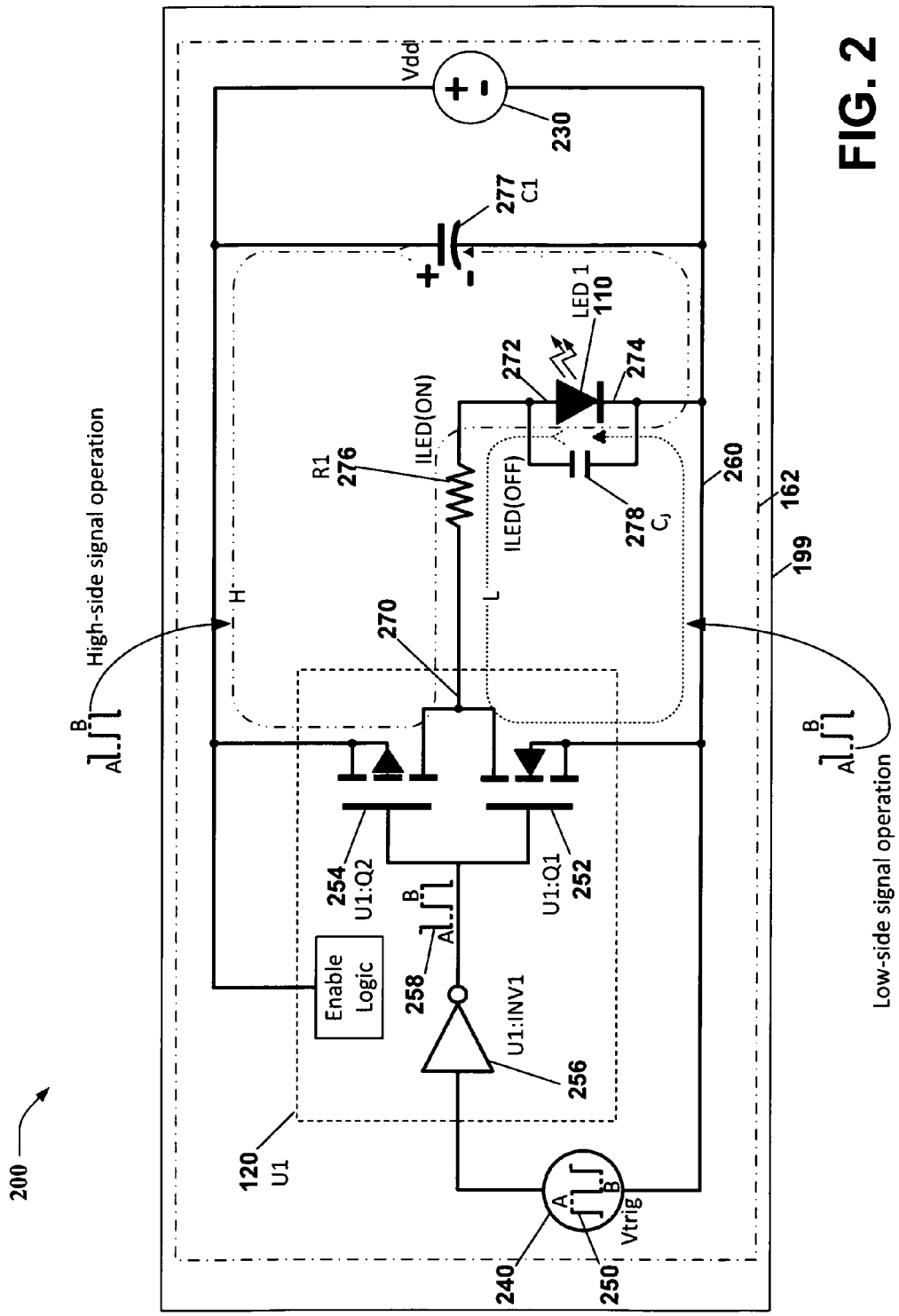
FIGS. 2, 3, 4, 5A, 5B, 5C, 6, 7, 8, 9, and 10 are schematics illustrating exemplary circuits that are configured to deliver short duration, high amplitude current pulses to a LED.

Now referring solely to FIG. 2, a circuit 200 is illustrated that facilitates driving the LED 110 with current pulsed with relatively short pulses (e.g., in the range of ≤20-100 nanoseconds to several microseconds or more). The circuit 100 comprises the LED 110 and the driver circuit 120, wherein the driver circuit 120 is configured to control operation of the LED 110. As further described herein, the circuit 200 can be modified to include several LEDs, where each of the LEDs can be pulsed with a relatively high current and at relatively high speeds. Further, as noted above, the LED 110 may be labeled as being a high power LED.

The circuit 200 further comprises a direct current (DC) voltage source 230, which is configured to output voltage (e.g., ranging between about ≤4.5 volts to about ≥40 volts). The circuit 200 further comprises a trigger source 240, wherein the trigger source 240 is configured to generate a pulsed trigger signal 250. Generally, the driver circuit 120 is controlled by the pulsed trigger signal 250 output by the trigger source 240. In an example, the pulsed trigger signal 250 can have a square wave profile. Further, the pulsed trigger signal 250 can range from about 0 to 1.1 volts when low to about 2.5-5.0 volts when high. Moreover, in an example, the pulsed trigger signal 250 can be of a variety of types capable of producing pulses in which the high time (on, or "true") duration may range from ≤8 nanoseconds up to several microseconds (or greater, including up to continuously on, i.e., any arbitrary value), repeated at any frequency ranging from arbitrarily low values (e.g., any lower bound, 1 Hz, 0.1 Hz, 0.001 Hz, etc.) up to several megahertz (e.g., the example circuits typically can operate at an upper bound of frequency of about 2 to 5 MHz, while providing at least 95% modulation, and typically ≥99% modulation).

The driver circuit 120 is configured to provide a relatively high current, where the current is pulsed with timing that is based upon the pulsed trigger signal 250. As illustrated, in an exemplary embodiment, the driver circuit 120 can include MOSFETs, and can further include a bipolar (2-quadrant) CMOS inverter power output stage. A level translation stage within the driver circuit 120 can allow the trigger signal source 240 to output the pulsed trigger signal 250 such that, when high, the pulsed trigger signal can have a standard logic voltage level such as 2.5 to 5V, for easy interfacing to external systems. Voltage generated at the DC voltage source 230, meanwhile, can be varied to indirectly control the peak drive current provided to the LED 110. As shown in FIG. 2, the driver circuit 120 can include an nMOS transistor 252 and a pMOS transistor 254, where gates of the transistors 252 and 254 are electrically connected to the trigger signal source 240. The driver circuit 120 can optionally include an inverter (or buffer) 256 (which may also incorporate the function(s) of (a) level translator(s) from the input logic level voltage range, to the ranges required internally to properly drive the gates of the output stage power MOSFETs) disposed between the trigger signal source 240 and the gates of the transistors 252 and 254.

The drains of the transistors 252 and 254 are electrically connected to the anode 272 of the LED 110. The cathode 274 of the LED 110 further is electrically connected to the ground (or negative power supply node, which is connected to the negative terminal of DC voltage source 230). Also connected to the ground are the source of the transistor 252, a negative terminal of a capacitor 277, and the negative side of trigger signal source 240, as shown in FIG. 2. More specifically, the cathode 274 of the LED 110 is electrically coupled to the ground, along with the source of the nMOS transistor 252, such that when also considering the connection of the LED anode to the drain of nMOS 252, these connections form a "low-side" output current loop L. The cathode 274 of the LED 110 is electrically coupled to the ground, as is the negative terminal of the capacitor 277, and also considering that the positive terminal of the capacitor 277 is connected to the positive power supply node, along with the drain of the pMOS 254, thus forms a "high-side" output current loop H. Current flows through the "low-side" loop when the nMOS transistor is switched on (and the pMOS transistor 254 is switched off), and current flows through the "high-side" loop when the pMOS transistor 254 is switched on (and the nMOS transistor 252 is switched off). The circuit 200 further comprises a resistor 276 coupled to the drains of the transistors 252 and 254 and further coupled to the anode of the LED 110. In an example, the resistor 276 can have a resistance of about 0.1 to about ≥0.2 ohms (Ω).

The circuit 200 additionally comprises the capacitor 277 placed in parallel with the DC voltage source 230, where the capacitor 277 is included in the "high-side" loop. When the pMOS transistor 254 is switched on, initially, charge stored at the capacitor 277 is released as current directed into the anode 272 of the LED 110 via the pMOS transistor 254 but after the initial rising edge of the output voltage, the current is drawn from power supply 230. For example, the capacitor 277 supplies current only during output transitions (L→H) of the output voltage pulse, but steady flows of current come from the power supply 230.

The circuit node comprising primarily the driver output (comprising the drains of 252 and 254), the LED anode 272, and optionally resistor 276 (which for the purpose of the immediate discussion may be considered as part of the wire connecting the LED anode 272 to the driver output 270), also includes unavoidable stray, or "parasitic" capacitance, as well as the intrinsic junction capacitance of the LED 110 (which may be the dominant capacitance), wherein these capacitances, and the sum total of their effects, is represented by the capacitor 278.

Operation of the circuit 200 is now described. The pulsed trigger source 240 outputs the pulsed trigger signal 250, which (in this example) is inverted by the inverter 256. An inverted signal 258 is directed to the gates of the pMOS and nMOS transistors 252 and 254, turning one of the transistors on while simultaneously turning the other transistor off. When the pMOS transistor 254 is switched on (when signal 258 is low, and thus the nMOS transistor 252 is switched off), current exiting the first capacitor 277 enters the source of the pMOS transistor 254, thereby causing current to exit the drain of the pMOS transistor 254. Such current passes through the resistor 276, and is directed to the anode of the LED 110. Current exits the LED 110 by way of its cathode, and is directed back to the first capacitor 277 (e.g., during the time it takes for the voltage to rise at the output/LED anode; then steady state current comes from voltage source 230). During the brief time that the turn-on current in the high-side loop is being supplied by the capacitor 277, as the voltage at the LED anode rises, it is primarily capacitor 278 (Cj) that is being charged. Likewise during the brief time that the turn-off current in the low-side loop flows (in reverse), as the voltage at the LED anode 272 declines back toward zero, it is primarily capacitor 278 that is being discharged.

When the nMOS transistor 252 is switched on (when signal 258 is high and thus the pMOS transistor is switched off), charge stored in capacitor 278 flows out of the anode terminal 272 of the LED 110, into the drain of the nMOS transistor 252, and is then directed to ground (finally returning to the LED 110 cathode terminal 274). Likewise, the DC voltage source 230 (and the capacitor) are coupled to ground. Using the driver circuit 120, the LED 110 can be "cycled" on and off relatively quickly (e.g., on the order of tens of nanoseconds, as noted above). In other words, the driver circuit 120 can rapidly cause a relative large amount of current to be delivered to the LED 110, followed by an as quickly as possible drop in current to zero. If the driver circuit 120 included only the pMOS transistor 254 (e.g., with no lower nMOS transistor 252), only a fast rise in forward current at the LED 110 can occur, as the LED 110 would effectively be able to only be connected to the DC power source 230 (and capacitor 277) through the pMOS transistor 254, e.g., only the high-side loop. Internal physics of the LED 110 cause the light emission to decay as pairs of charge carriers in the LED junction recombine in the absence of an externally applied electric field. Such natural decay results in a slow decline in light output from the LED 110, e.g., on the order of a few hundred nanoseconds, in comparison with the LED 110 turning on with high-side drive in 10s of nanoseconds. Accordingly, the pulse shape at the LED 110 would be a characteristic pulse shape comprising a relatively square rising edge, a flat top and then a slowly decaying falling edge (e.g., exponential-like decay). Owing to junction capacitance, other stray capacitance, and inductance, it is not possible to instantaneously start or stop current from flowing through the LED 110 in such an arrangement.

Thus, the nMOS transistor 252 (and corresponding "low-side" loop) are employed to accelerate the decay of the light emission at the LED 110. Utilizing the configurations presented herein, the nMOS transistor 252 connects the anode of the LED 110 to ground when the LED 110 ceases light transmission. Accordingly, current can flow out of the LED 110 to ground, rapidly discharging the junction capacitance 278, resulting in a very rapid decline of light output at the LED 110. Utilizing the nMOS transistor 252 (e.g., in combination with the pMOS transistor 254) enables charge carriers to escape the LED 110 through the anode and cathode thereof as opposed to re-combining at the junction of the LED 110, which would cause the LED 110 to continue emitting light in an undesired slow decay. Therefore, the optical pulse emitted by the LED 110 has a shape comprising a fast rising edge, a flat top and then a fast falling edge (e.g., the light emitted from the LED 110 substantially conforms to a square wave). In other words, the bipolar circuitry of the driver circuit 120 enables the LED 110 to be quickly turned ON and OFF, enabling the pulse width during light transmission to be reduced to a range of nanoseconds, as opposed to approximately hundreds of nanosecond(s) range achievable with a unipolar (high-side only) driver circuit. At the limits of achievable short optical pulse duration (e.g., approximately 5 ns), however, the pulse shape approaches that of an exponential rise and fall, as well as undergoing diminishing amplitude.

In an exemplary embodiment, the circuit 100 can be placed on a printed circuit board (PCB) 262, which in turn can be located on a heat sink 299. While the circuit 200 illustrates a configuration that includes a single driver circuit 120 and LED 110, as described above, a plurality of LEDs and/or a plurality of driver circuits can be mounted on a same PCB. Multiple LEDs, driver circuits, and other associated circuitry can be manufactured on several PCBs, which can be assembled on a heat sink while also being electrically connected to each other and various LED packages. In a non-limiting example, the LED 110 can be mounted at one end of the heat sink 299, with at least a portion of the driver circuit 120 mounted on the PCB to optimize electrical and thermal performance. Further, when multiple PCBs 262 are used, the PCBs can be oriented so as to not impede the natural convection air flow through the heat sink. The heat sink can include mechanical features to interface with standard opto-mechanical mounting systems such as optic mounts, posts, and cage/rod systems, and can also have a cooling fan mounted thereon. The LED mounting surface and other mechanical features can provide the ability to precisely mount and position optics for collecting and manipulating the light emitted from the LED 110, along with the ability to integrate the system 100 into larger apparatuses.

To enable peak intensity, flux, or radiance levels to be achieved that are several multiples of that which the LED 110 can produce in continuous-wave (CW) operation, the peak output current delivered to the LED 110 by the driver circuit 120 can be permitted to exceed the maximum continuous forward current ratings of the LED 110 by a multiple, such as 1-30 times the maximum continuous forward current ratings of the LED 110.

Operating the LED 110 with such multiples of high maximum continuous forward current ratings can be tolerated by a typical high-power LED for short pulse durations and low duty ratios, provided that the average and instantaneous thermal stresses, as well as instantaneous current density to which the junction and die attachments of the LED 110 are subjected to do not exceed maximums where specified or otherwise determined as a pulsed overdrive damage threshold (e.g., via experimental characterization or as otherwise estimated or predicted).

Utilizing a driver circuit 120 circuit with bipolar drive, the nMOS transistor 252 in the driver circuit 120 can shunt stored charge from the LED 110 to ground during turn-OFF transitions, resulting in faster and "squarer" turn-OFF transitions versus transitions obtained from a single-ended (1-quadrant, or source current only) driver circuit. Furthermore, in contrast to slower pulse performance observed when driving single large area LEDs, the various embodiments presented herein enable much shorter pulses with improved brightness to be achieved by instead driving a LED package containing several smaller series-connected LEDs. This can permit higher supply voltages to be used, resulting in faster driver output slew rates before reaching the highest non-destructive LED current densities.

It can be challenging to achieve optical pulses shorter than about 100 nanoseconds (ns) with peak flux at least as great as the manufacturer specified CW flux for a given high power LED with die area of 1 sq. mm or larger. For 1 sq. mm LEDs, achieving pulses ranging from about 50 ns down to 16-20 ns becomes, respectively, very challenging to nearly impossible. This is partly because high power LEDs have high capacitance due to large junction areas, and also high parasitic inductance can be present due to the fact that the LED packages are manufactured primarily for continuous wave (CW) lighting applications and hence are not optimized to minimize the electrical circuit loop area. Additional difficulty arises from the mismatch between the typical forward voltages of LEDs (e.g., 2.2 to 3.6V) and the power supply voltage levels at which typical gate driver ICs, in cases where such ICs are used as the implantation of 120 attain their fastest transition time performance, which is usually near their maximum allowed supply voltage (18 to 40V).

In order to avoid contributing to the obstacles which restrain the possibilities for obtaining fast pulse performance from high power LEDs, a PCB that includes the driver circuit 120 can be designed to:

1. utilize one or more pairs of closely spaced solid copper power supply planes located as close as possible to each other and to the outer PCB surface on which the driver circuits are mounted;

2. apply one or more techniques for minimizing the parasitic inductance of the interconnects between power planes and bulk storage (bypass) capacitors, and the connections of the power planes to the gate driver IC power and ground terminals;

3. utilize surface mount components for all high-speed signal and power handling components;

4. utilize via-in-pad (VIP) PCB fabrication technology to most effectively minimize parasitic inductances.

Figure 3:
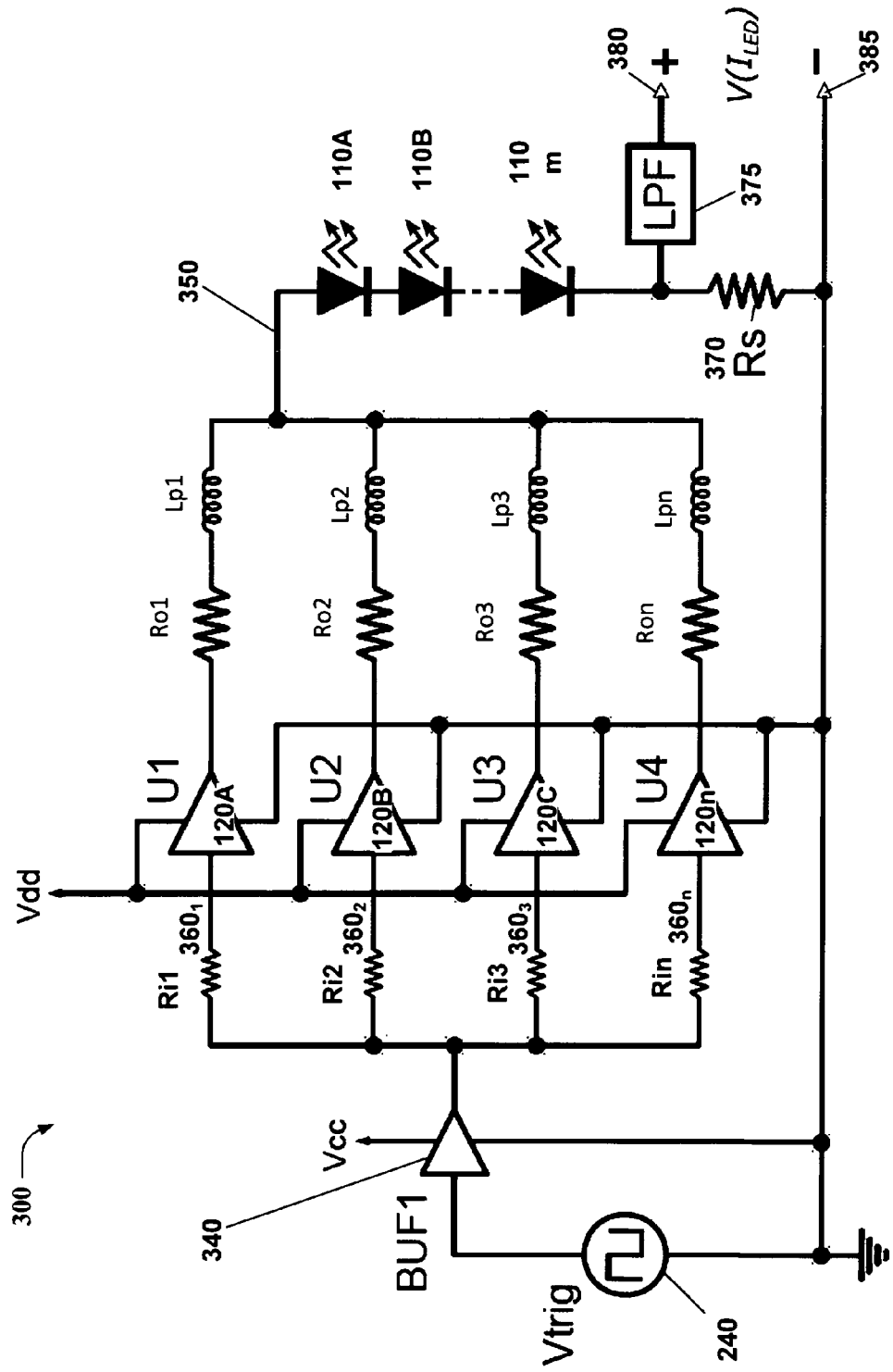

A number of concepts regarding the various embodiments presented herein are now described with reference to FIG. 3, which depicts an exemplary circuit 300. In order to produce greater peak pulse currents and shorter minimum pulse durations than may be obtained from a single driver circuit (e.g., a larger, and thus slower, driver circuit 120 operating in isolation), a plurality of LED driver circuits 120A-120n can be utilized and connected in parallel, where n is a positive integer. As shown, any number of driver circuits can be utilized.

Outputs of the driver circuits 120A-120n are connected to the anode of a single LED 110 (as represented in FIG. 2) or a series stack of LEDs 110A-110n, (or some other combination, such as parallel, parallel strings of series, etc.). The driver circuits are driven by the trigger signal generator 240 and/or by a buffer 340 (e.g., a Schmitt trigger input buffer), level translator, etc.

The parallel output connections from the driver circuits 120A-120n sum the currents from each respective driver circuits 120A-120n. Accordingly, if n driver circuits rated for X amperes are utilized, then the total output current from the driver circuits 120A-120n can be up to n*X amperes.

Parasitic inductance in the driver output 350 of the driver circuits 120 can be a significant limiting factor regarding the rise and fall times of the LED ON-OFF transitions. The parallel connection of the driver circuits 120A-120n can reduce the total output circuit inductance, as compared with the total output circuit inductance when utilizing a single driver circuit (e.g., driver circuit 120 operating in isolation, or where the driver circuit 120 is constructed so as to be capable of the same total output current n*X). The parasitic inductances of each respective channel are indicated by inductors Lp1-Lpn. Accordingly, a portion of the total output circuit inductance at the output channel can therefore be significantly reduced.

Further minimization of the output circuit inductance can be achieved by utilizing a low impedance transmission line interconnect 350 between the outputs of the driver circuits 120A-120n and the LED anode. The interconnect 350 can be a low impedance multi-conductor transmission line interconnect, e.g., comprising multiple parallel conductors such as a ribbon cable with alternating ground/signal/ground/signal/etc., or by braiding the n driver output wires with multiple return current wires, or as a group of parallel coaxial cables (as previously described).

Mismatch between the propagation delays as well as the rise and fall times of individual driver circuits 120A-120n can broaden output pulses, as well as enable potentially destructive cross-conduction currents to flow, when paralleling multiple driver channel outputs. These issues can be to some degree addressed by utilizing sets of driver circuits 120A-120n that have been individually characterized and subsequently matched for minimum spread of propagation delays and rise/fall times to reduce the speed degrading effect and accordingly increase (optimize) the minimum achievable pulse durations.

Another technique to optimize for the fastest possible performance is to drive series connected LEDs, where the choice of the number (m) of LEDs 110 is such that the forward voltage of the load near peak operating current is matched as well as possible with the output voltage of the LED driver circuits 120A-120n (and the associated supply voltage, Vdd, of the DC power supply 230) where the LED driver circuits 120A-120n exhibit their optimal output slew rates.

Further, gross mismatch of peak currents between the driver channels can be avoided by utilizing current sharing resistors Ro1-Ron, on the individual driver circuit outputs (e.g., prior to the outputs being combined). The output resistors can have any suitable resistance rating to minimize or negate peak current mismatch of the driver circuit outputs, for example, the output resistors Ro1-Ron can have a respective resistance value in the range of about $0.1\Omega$ to about $1.0\Omega$. In a configuration where LEDs 110A-110m are several different colored LEDs, each with independent driver channels, (and understanding that different colored LEDs have different Vf(If) characteristics) the values of Ro1-Ron may instead be made different from each other, to match either the currents in the channels, or the effective (radiometric or photometric) brightness of the differently colored LEDs 110A-110m.

High speed, high current driver circuits may produce switching transients which may couple noise "glitches" out of the driver circuit's input terminals, e.g., respectively identified $360_1$-$360_n$. To prevent the switching transients which might couple out of a driver circuit's input from contributing noise to the inputs of the other drivers, input isolation resistors Ri1, Ri2, Ri3, and Rin can be placed near the respective driver circuit input terminals $360_1$-$360_n$. The input resistors can have any suitable resistance rating to facilitate isolation of the driver ICs 120A-120n, for example, the input resistors Ri1-Rin can have a respective resistance value in the range of about $10\Omega$ to about $100\Omega$.

A current sense resistor 370 (Rs) can also be utilized, optionally in conjunction with a low pass filter (LPF) 375. Utilizing the current sense resistor 370 develops a voltage signal $V(I_{LED})$ (e.g., across test points 380 and 385), which is proportional to the LED forward current, $I_{LED}$. In an embodiment, the voltage signal $V(I_{LED})$ (where, $I_{LED}$ is also referred to as If herein) can be utilized (e.g., with any suitable device, such as an oscilloscope (not shown)) to determine (measure) the LED pulse current $I_{LED}$. In another embodiment, the voltage signal $V(I_{LED})$ can be utilized to dynamically prevent LED damage, wherein the damage prevention can be performed in conjunction with any suitable device, e.g., protection circuitry, to which the signal $V(I_{LED})$ may be provided. The current sense resistor 370 can have any suitable resistance rating to facilitate measurement of the LED pulse current $I_{LED}$, for example, the current sense resistor 370 can have a respective resistance value in the range of about $\leq 0.02\Omega$ to about $\geq 0.2\Omega$, wherein the voltage signal $V(I_{LED})$ for measurement of $I_{LED}$ can have a value of about 0.02 V/A to about 0.2 V/A (or lower/higher, respectively).

Figure 4:
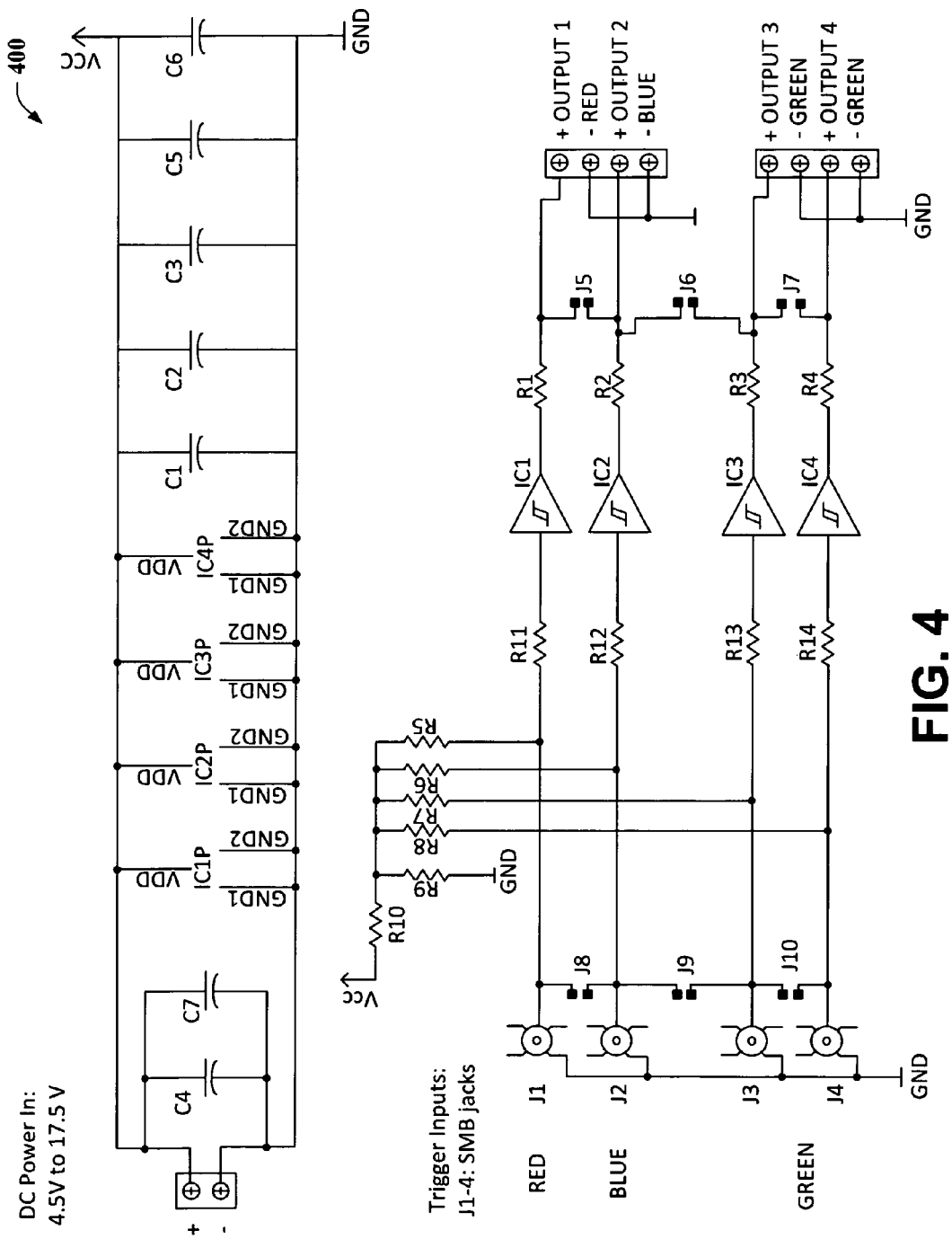

The individual channels of one or more driver PCBs may be paralleled to achieve a higher drive current than that provided by a single channel. Paralleling channels allows the total drive current to scale linearly with the number of channels. By utilizing one or more driver PCBs with channels paralleled in various ways, it is possible to drive an arbitrary number of LEDs or groups of series-connected. LEDs, each with a unique color, including any visible color, as well as near-IR and UV-A (to about 365 nm), and where each color has independently triggered pulse timing. FIG. 4 presents a schematic diagram 400 for an exemplary driver circuit with four independent channels, each capable of 9-30A of pulse current. Thus when such a quad channel system has its output paralleled (by connecting J5, J6, and J7), the sum total output pulse current may be up to 120 A.

Figure 5A:
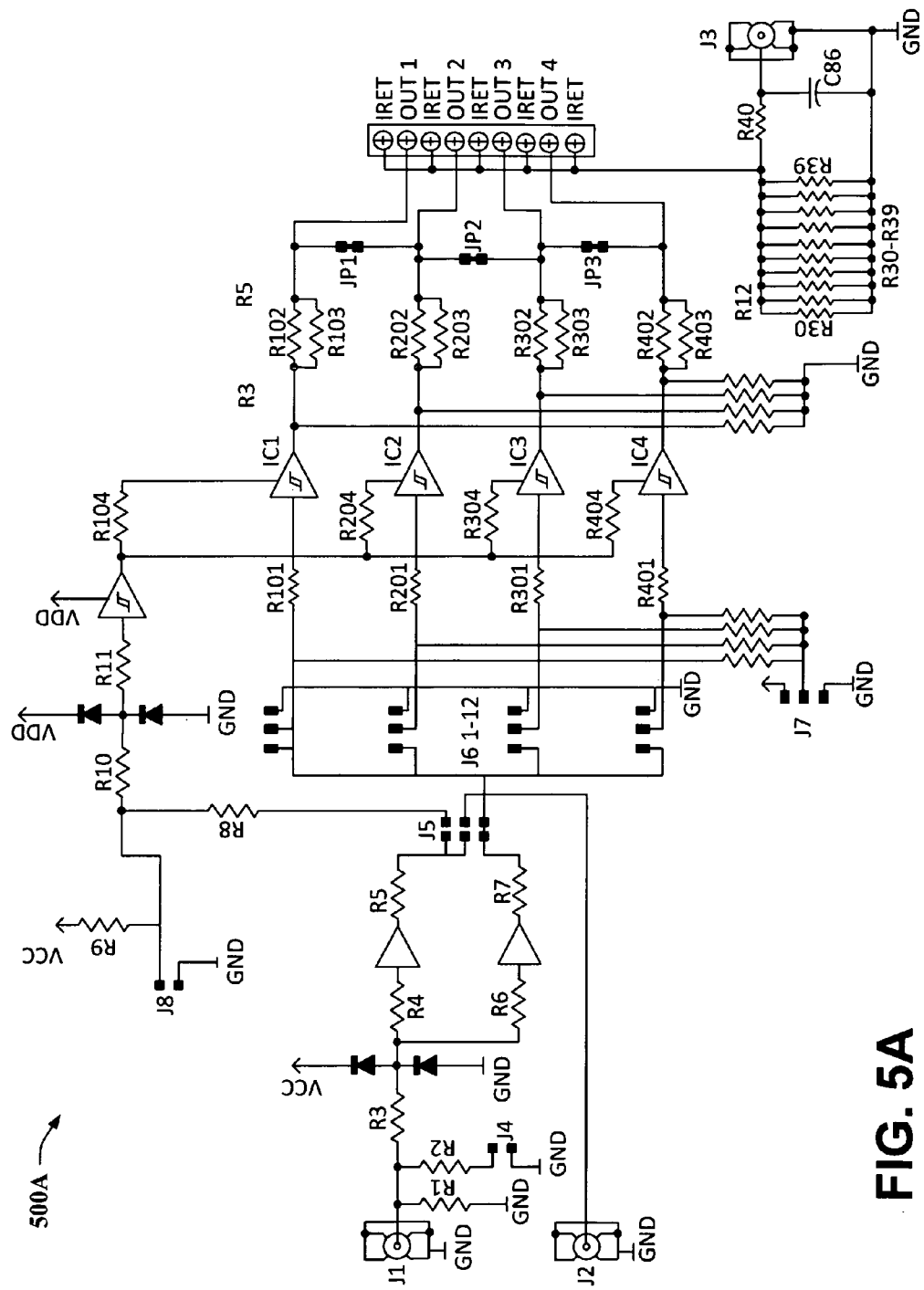
Figure 5B:
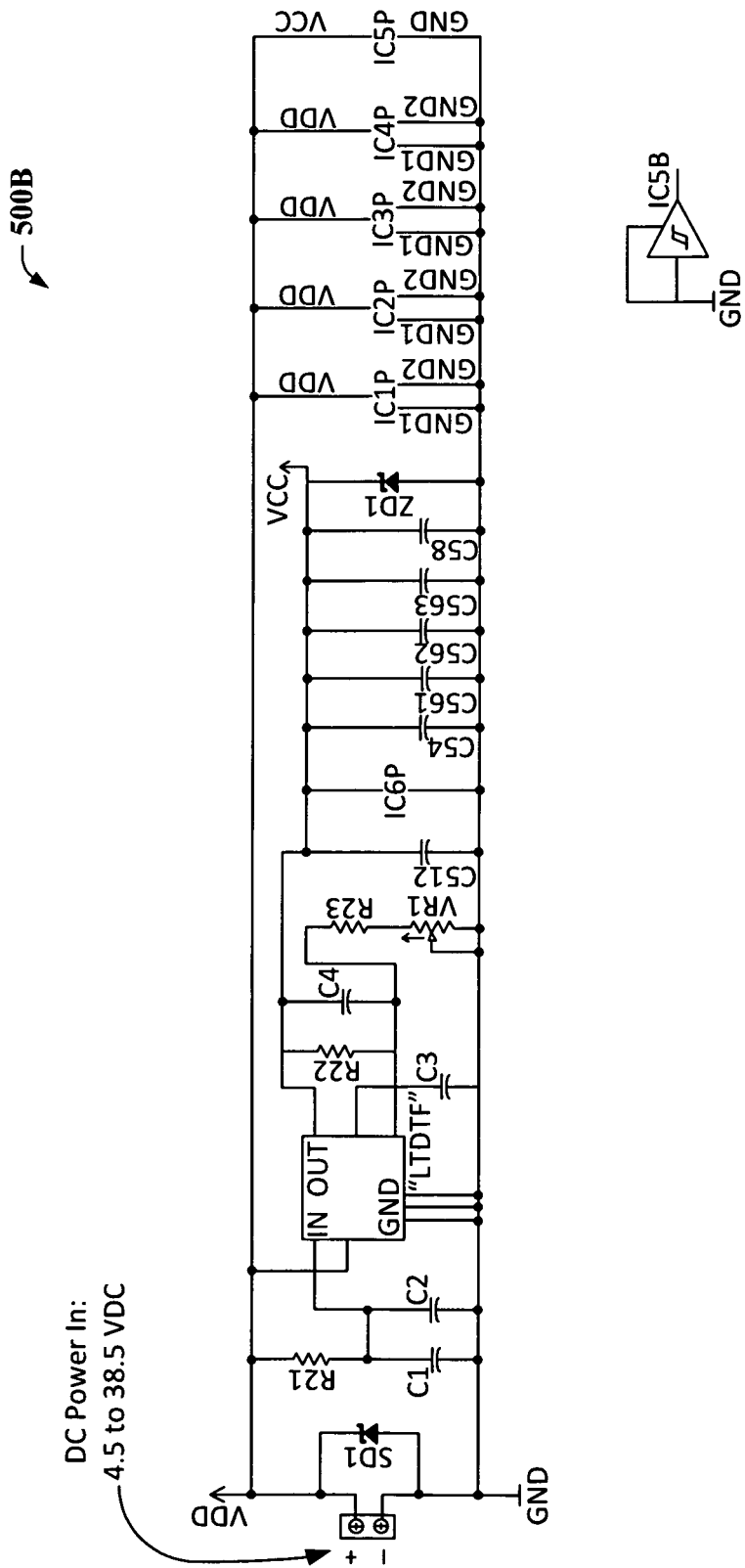
Figure 5C:
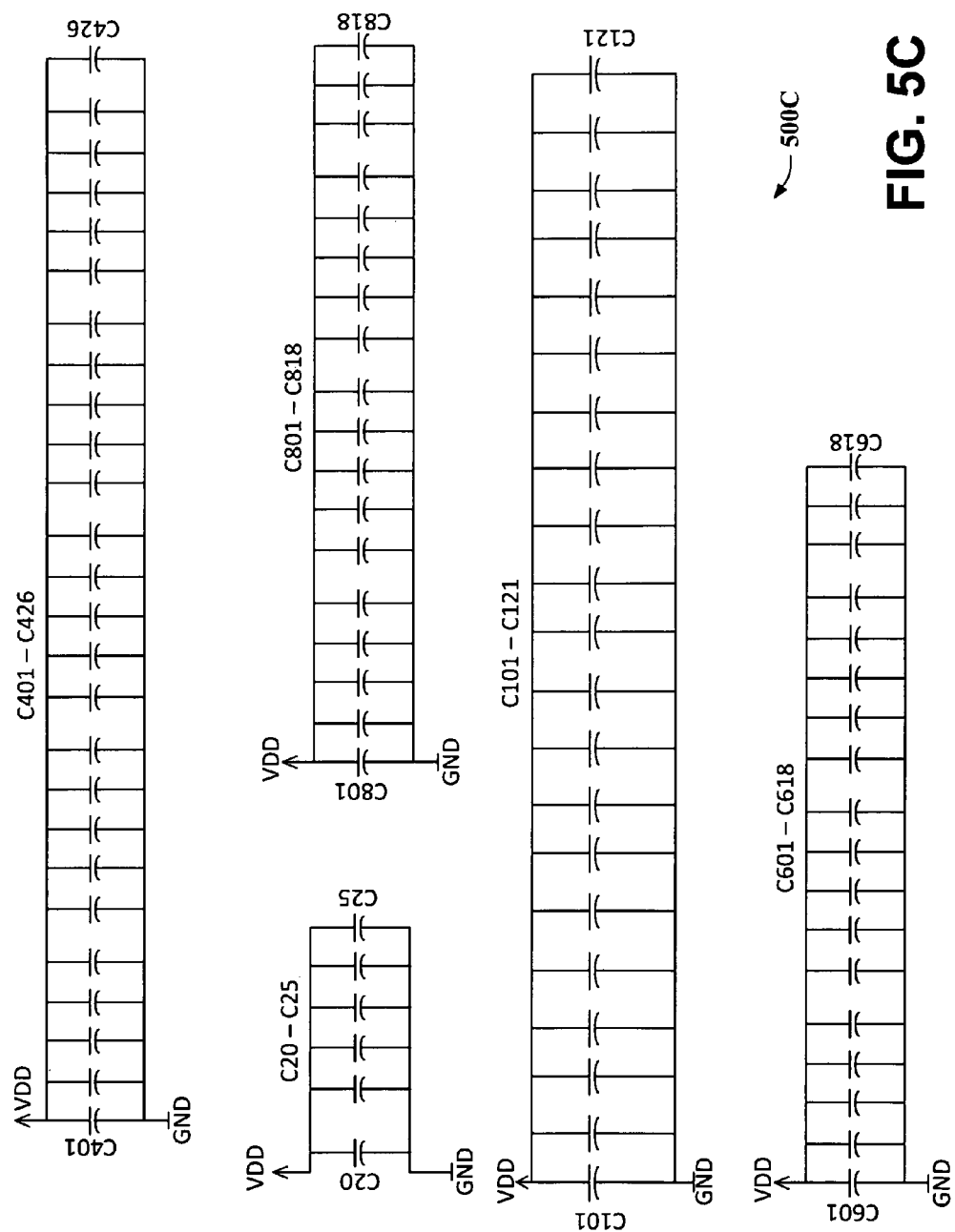

In another exemplary embodiment, the driver PCB can include a variable voltage supply (Vcc) for, powering an optional input buffer stage prior to the driver circuit input. FIG. 5 presents a schematic diagram 500 for an exemplary working implementation—it is to be noted that to enable presentation of the circuit 500 in accordance with USPTO requirements, circuit 500 has been separated between FIGS. 5A-5C (circuits 500A-500C), however the circuits 500A-500C are to be read as a single circuit and, accordingly, FIGS. 5A-5C are collectively referred to herein as FIG. 5. By adjusting the voltage supply or the amplitude of an external signal source directly connected to the gate driver input and configured to generate a very short input trigger pulse of 8-40 ns (e.g., as typical values), it is possible to just cross the input switching threshold of the gate driver for a period of time significantly shorter than the full-width at half-maximum (FWHM) width of the trigger pulse. Using this adjustment technique in addition to adjusting the power supply voltage to the gate driver output stage in an exploratory manner while monitoring the light output with a photo-LED and oscilloscope, it is possible to obtain shorter optical pulses from the LED than what would be produced with input trigger pulses that swing to a full 5V (or whatever value is the full specified "normal" range of the trigger input).

A dual-buffered master-in/master-out and (unbuffered) slave-in circuit (or "MI/MOSI" system architecture) can enable paralleling the drivers from two or more driver PCBs (or other types of constructions) while also minimizing timing skew between groups of paralleled channels, and employing trigger input signal dual buffering to avoid excessive loading of the trigger signal source. FIG. 5 further presents an exemplary working implementation. The circuit shown in FIG. 5 can also include an enable (EN) input which, when pulled low, puts all of the driver output channels into a high impedance state. This EN input may be employed by an add-on protection circuit module, such as implemented as an attachable daughter-board, which can help avoid LED damage which can result from high-current pulses of too great a duration, too high current amplitude, etc.

Optional continuous wave operation of the LED can be valuable for various purposes such as optical setup as well as possibly being essential for performing calibration aspects of LED & driver system radiometric or photometric characterization procedures. Continuous wave operation is possible with the circuits presented in FIGS. 2-5, wherein an associated LED connected to a/the driver system output(s) can be powered with a constant current (CC) regulated power supply set to a suitable test current (typically as specified in a datasheet of the LED), a voltage slightly greater than the LED forward voltage at the selected current, and by providing the trigger input with a steady high level. However, this technique may fail if, for example, the IXYS IXD_630 gate driver ICs are utilized in FIG. 5 and in which the IXD_630 incorporates an under voltage lockout feature whose voltage threshold is greater than the LED Vf. Thus, the EN input feature can facilitate another approach to CW operation which can also work when such IXD_630 or similar ICs or other driver circuit implementations also including features or limitations precluding CW operation of the LED via the method described above are used. In this case, CW can be attained by disabling the driver outputs, such that the outputs are in a high impedance state, and applying an external source of constant current directly into the driver output terminals (such that the CC then flows into the LED anode).

FIGS. 5-10 present various exemplary circuits that include switch matrices, as discussed above with respect to FIG. 1. It is emphasized that these circuits are merely exemplary, as any suitable arrangement of circuit elements that accomplishes the functionality of the described herein is contemplated and intended to fall under the scope of the hereto-appended claims.

FIG. 7, illustrates a circuit 700 comprising a MI/MISO bridged pair of paralleled quad high-speed high-current high-power LED pulser sub-systems. Driver ICs 120A-D operate as master MOSFET Gate Driver ICs (e.g., type IXYS IXDD614YI or IXDD630MYI (or similar)) while Driver ICs 120E-n operate as slave MOSFET Gate Driver ICs (e.g., type IXYS IXDD614YI or IXDD630MYI (or similar)). Buffers 340A and 340B are non-inverting input buffer ICs (e.g., type Fairchild NC7WZ16P6X (or similar)). Resistors R1-4 are master driver channel output (current sharing) resistors, 0.1-0.2Ω, while resistors R5-8 are slave driver channel output (current sharing) resistors, 0.1-0.2Ω. Resistor R9 is an input termination or pull-down resistor for the externally provided trigger signal. LED 110 is a power LED(s) to be pulsed at high current/high-speed (as previously described). J1 is a master input for Vtrig trigger pulse signal source, whose square wave pulses will command both groups of LED drivers to (in unison) turn LED on/off. J2 is a master output of buffered Vtrig trigger pulse signal, to provide the Vtrig signal for the slave. J3 is a slave input for Vtrig trigger pulse signal source. JP1 is a configuration switch matrix for master—set to buffer, trigger input signal through two identical buffers, routing one buffered signal to the master JP2, and the other out J2 (to send to the slave). JP2 is a configuration switch matrix for master—set to drive the inputs of all 4 master power stages with a buffered version of the trigger signal. JP3 is a configuration switch matrix for slave-set to pass the trigger input signal unbuffered to JP4. JP4 is a configuration switch matrix for slave-set to drive the inputs of all 4 slave power stages with the unbuffered trigger signal. JP12 is a configuration switch/jumper set to parallel the driver channel outputs from U1 and U2. JPnm is a configurable switch/jumper set to parallel the driver channel outputs from Un and Urn. When including two of the quad drier sub-systems, e.g., as depicted in FIG. 5, where each sub-system is capable of up to 120 A of pulse current output, the resulting dual bridged MI/MOSI system can produce up to 240 A of the output pulse current. It is further possible, by adding additional master output buffers and corresponding parallel slave channels, to scale up to higher total currents.

As previously mentioned, a protection circuit can be included in one or more circuits presented herein to prevent failure of the LED 110 and/or the driver circuit 120. As shown in FIG. 10, circuit 1000 presents a LED protection circuit/module 1010 integrated with LED driver system. The circuit 1000 comprises a plurality of previously described components operating in conjunction the LED 110 and a driver circuit 120. As shown, the driver circuit 120 includes a driver channel(s) 1020 in conjunction with an AND gate 1030 (or other logic) which allows the protection circuit 1010 to inhibit the trigger signal from reaching the input of the driver channel 1020. A photoreceiver 1040 can be included in circuit 1000 which is configured to sense a portion of the light output from LED the 110. Circuit 1000 further comprises a DC power supply, Vdd, and further a trigger pulse signal source 240, producing square wave pulses 250 to command LED driver 120 to turn LED 110 on/off. Signals that can be measured and/or utilized by the protection circuit to determine an instantaneous well-being condition of the LED 110 include TRIG_MON=sample of trigger signal 250, V(If)=signal representing instantaneous LED current at the LED 110, Vf=signal representing instantaneous LED forward voltage, Po=signal from photoreceiver

1040 representing instantaneous LED optical power output, Temp=signal representing temperature of LED 110 emitter substrate or heat sink upon which the LED 110 is located, Vdd=DC power supply voltage signal. Signals which can be calculated and/or output by the protection circuit 1010 can include TRIG_GATE=signal which may be made logically false to cut off power to the LED overriding the trigger signal, if this is necessary to prevent LED destruction or damage, EN=enable signal to driver(s) which may be made logically false to cut off power to the LED, if this is necessary to prevent LED destruction or damage, etc. The various embodiments, and/or combinations thereof, presented herein, enables driver circuit technology to achieve shorter light pulse durations at higher radiances than what is available with COTS LED stroboscopic illumination products, while also providing a high degree of configuration flexibility in both the circuitry and the LEDs used, e.g., for research and development applications.

Typically observed performance characteristics as obtained from experimental implementations and applications of the circuits shown in FIGS. 4 and 5, and also another prototype implementation including minimum pulse duration, peak optical flux, peak radiant exitance, maximum repetition frequency etc., are listed in Table 1, below.

| Parameter | Symbol | Value | Units | Comments |
|---|---|---|---|---|
| peak radiant flux | max{$P_o$} | 46.9 | W | Blue Luminus Devices, Inc. SST-90 LED, 3 × 3 mm die; 2.1 μs, 120A pulse |
| peak radiant flux | Max{$P_o$} | 54 | W | Blue Luminus Devices, Inc. CBT-90 LED, 3 × 3 mm die; 2.0 μs, 240A pulse |
| peak radiant exitance | max{$M_o$} | 13.9 | W/mm² | Blue Cree XT-E LED; 2 μs, 56A pulse; saturated, probably not sustainable |
| peak radiant exitance | max{$M_o$} | 12 | W/mm² | Blue Cree XT-E LED; 2 μs, 24A pulse |
| shortest pulse duration | min{$t_{pw\_o}$} | 20 | ns | FWHM; max{$P_o$} = 13.8 W from blue LEDengin quad series die LZ4 LED |
| shortest pulse duration | min{$t_{pw\_o}$} | 18 | ns | FWHM; max{$P_o$} = 10.4 W from blue LEDengin quad series die LZ4 LED |
| shortest pulse duration | min{$t_{pw\_o}$} | 17 | ns | FWHM; max{$P_o$} = 6.9 W from blue LEDengin quad series die LZ4 LED |
| shortest pulse duration | min{$t_{pw\_o}$} | 16.2 | ns | FWHM; max{$P_o$} = 5.2 W from blue LEDengin quad series die LZ4 LED |
| shortest pulse duration | min{$t_{pw\_o}$} | 9.8 | ns | FWHM; max{$P_o$} = 4.4 W from violet LEDengin quad series die LZ4 LED; this version may no longer be available |
| shortest pulse duration | min{$t_{pw\_o}$} | 8.9 | ns | FWHM; max{$P_o$} ≥ 4 W from royal blue Philips Lumileds Luxeon M LED (12 V type) directly electrically and mechanically integrated with prototype IXD_604 driver |
| peak LED forward current | max{$I_F$} | 120.0 | A | quad parallel IXD_630 |
| peak pulse current | max{$I_F$} | 240.0 | A | MI/MOSI bridged quad parallel IXD_630 driver pair |
| maximum repetition frequency | $f_{max}$ | 2-5 | MHz | >99% modulation |

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
a light emitting diode (LED); and
a LED driver circuit that comprises:
an nMOS transistor; and
a pMOS transistor, wherein gates of the nMOS transistor and the pMOS transistor are electrically connected to a pulsed trigger source that emits a pulsed trigger signal, wherein the LED driver circuit is configured to deliver pulsed current to the LED as a function of the pulsed trigger signal, wherein the pulsed current has a peak amplitude that is greater than a maximum continuous forward current rating of the LED, the LED emits pulses of light in correspondence with the pulsed current.

2. The system of claim 1, wherein the peak amplitude is about 10 to about 30 times greater than the maximum continuous forward current rating of the LED.

3. The system of claim 1, wherein the peak amplitude current is up to about 30 times greater than the maximum continuous forward current rating of the LED.

4. The system of claim 1, wherein the pulsed current is short duration pulsed current, wherein each pulse in the pulsed current has a duration of between 5 ns and 20 ns.

5. The system of claim 1, further comprising the pulsed trigger source, the pulsed trigger source configured to output the pulsed trigger signal with an amplitude of about 5 volts when high.

6. The system of claim 5, further comprising:
a direct current (DC) voltage source; and
a capacitor placed in parallel with the DC voltage source, the capacitor electrically connected to the LED driver circuit.

7. The system of claim 6, wherein an anode of the LED is connected to ground when the nMOS transistor is switched on and the pMOS transistor is switched off.

8. The system of claim 7, wherein the DC voltage source is connected to ground when the nMOS transistor is switched on and the pMOS transistor is switched off.

9. The system of claim 1, wherein the LED is a high power LED, wherein the high power LED is rated with a current density of at least 0.35 amperes/mm².

10. An apparatus comprising:
a light emitting diode (LED); and
a driver circuit that comprises:
an nMOS transistor; and
a pMOS transistor, where gates of the nMOS transistor and the pMOS transistor are coupled to one another such that the nMOS transistor and the pMOS transistor are activated by a common input signal, wherein the driver circuit drives the LED with short duration, high-amplitude current pulses, wherein the driver circuit is a bipolar driver circuit, each pulse in the short duration, high-amplitude current pulses has a duration of between 5 and 100 ns, and wherein each pulse in the short duration, high-amplitude current pulses has an amplitude that is greater than a maximum continuous forward current rating of the LED.

11. The apparatus of claim 10, the driver circuit causes the LED to emit short duration optical pulses, wherein each pulse in the short duration optical pulses has a duration of between 5 and 100 ns.

12. The apparatus of claim 10, further comprising a second driver circuit that is placed electrically in parallel with the driver circuit, the driver circuit and the second driver circuit operate in conjunction to drive the LED.

13. The apparatus of claim 10, further comprising:
a second LED; and
a second driver circuit that drives the second LED, the driver circuit and the second driver circuit are independently triggerable to drive the LED and the second LED, respectively.

14. The apparatus of claim 13, the LED and the second LED emit light of different colors.

15. The apparatus of claim 13, further comprising a matrix of switches that are configured to connect and disconnect portions of the apparatus.

16. A method comprising:
electrically arranging a plurality of driver circuits in parallel with one another, wherein each driver circuit in the plurality of driver circuits is configured to emit pulsed current, and further wherein each driver circuit comprises:
an nMOS transistor; and
a pMOS transistor, wherein gates of the nMOS transistor and the pMOS transistor are electrically connected to a pulsed trigger source that emits a pulsed trigger signal, the light emitting diode (LED) driver circuit delivers the pulsed current as a function of the pulsed trigger signal; and
electrically coupling the plurality of driver circuits to at least one LED, such that the pulsed current emitted from the plurality of driver circuits causes the LED to emit pulses of light, wherein the pulsed current has a peak amplitude that is greater than a maximum continuous forward current rating of the LED, the LED emits pulses of light in correspondence with the pulsed current.

17. The method of claim 16, wherein the plurality of driver circuits are bipolar driver circuits.

18. The method of claim 16, wherein the peak amplitude is about 10 to about 30 times greater than the maximum continuous forward current rating of the LED.

19. The method of claim 16, wherein the peak amplitude current is up to about 30 times greater than the maximum continuous forward current rating of the LED.

20. The method of claim 16, wherein the pulsed current is short duration pulsed current, wherein each pulse in the pulsed current has a duration of between 5 ns and 20 ns.

* * * * *